Feb. 28, 1933.                C. B. LITTERIO                1,899,920
                              CYLINDER GAUGE
                            Filed April 20, 1931
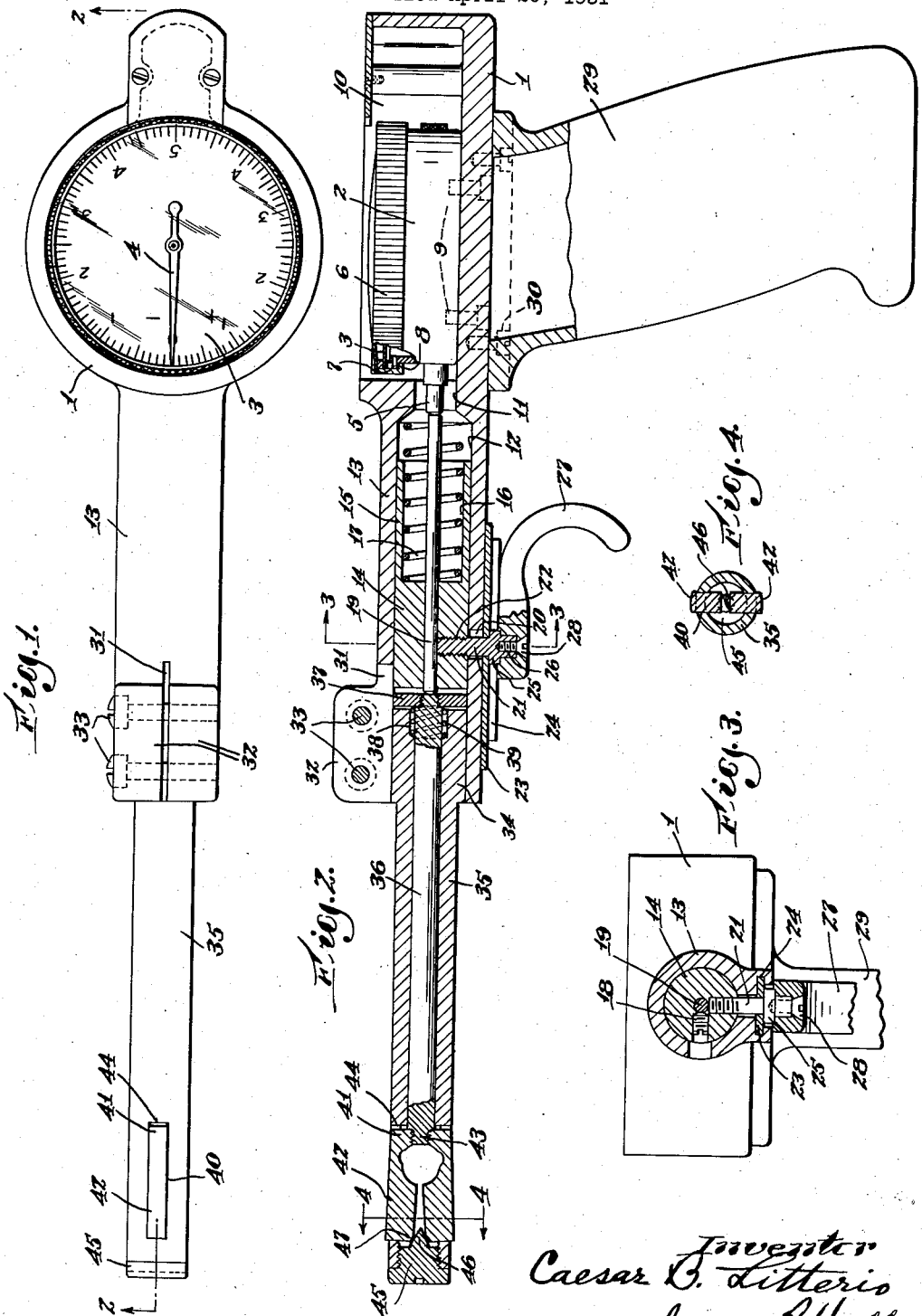

Patented Feb. 28, 1933

1,899,920

UNITED STATES PATENT OFFICE

CAESAR B. LITTERIO, OF PROVIDENCE, RHODE ISLAND, ASSIGNOR TO FEDERAL PRODUCTS CORPORATION, OF PROVIDENCE, RHODE ISLAND, A CORPORATION OF RHODE ISLAND

CYLINDER GAUGE

Application filed April 20, 1931. Serial No. 531,448.

My present invention relates to gauges, and more particularly to a novel and improved gauge primarily intended and adapted for use in measuring internal bores and diameters.

An important object of the present invention resides in the provision of a cylinder gauge which will give a visual reading of the conditions existing on the interior of a cylinder to be measured with a great degree of accuracy, my novel gauge being extremely sensitive and accurate in its measurements and indications.

Another object of the invention resides in providing a gauge which is economical to manufacture, and which is extremely simple to manipulate in use.

A further object of the invention resides in the provision of a cy.nder gauge which may be moved to gauging position without contact of the gauge feelers with the walls of the work to be measured. Thus there is no sliding or destructive friction imposed upon the gauge feelers during their traverse of a bore to the point or points to be gauged. In other words, the gauge feelers are not introduced into the bore under pressure, the pressure being applied to said feelers when the point to be gauged has been reached.

Another object of the invention resides in the provision of a cylinder gauge wherein the gauge feelers and their carrier may be readily interchanged in the body or amplifying portion of the device.

Other objects and features of the present invention reside in the particular construction and arrangement of the parts thereof, and all of the above, and other features and objects, combinations of parts, details of construction, and advantages, will be hereinafter more fully pointed out, described and claimed.

Referring to the drawing illustrating a preferred embodiment of the invention,

Fig. 1 is a top plan view of my novel gauge;

Fig. 2 is a longitudinal sectional view on the line 2—2 of Fig. 1;

Fig. 3 is a cross sectional view on the line 3—3 of Fig. 2; and

Fig. 4 is a cross sectional view on the line 4—4 of Fig. 2.

Referring now to the drawing for a particular description of the invention, its construction and operation, 1 designates a body or standard within which is fixed an amplifying gauge 2 provided with a dial 3 which in turn is provided with any suitable or desirable graduations or calibrations. An indicator hand or needle 4 is provided in the gauge 2, said hand being operated by a movable plunger 5, sliding movement of the plunger 5 being converted into rotative movement of the needle 4 in the usual manner.

The dial 3 is fixed in a frame 6, said frame being rotatable relative to the body of the gauge 2, pins 7 and flange 8 preventing inadvertent separation of the frame 6 from the body 2. The gauge 2 is held in the standard 1 by screws 9 or in any other desired manner. As will be noted from a glance at Fig. 2, the gauge 2 is set in a recess 10, and the sliding plunger 5 projects through a passage 11 communicating with the recess 10 and with the hollow interior 12 of the projecting tubular portion 13 of the standard 1.

Slidable within the interior 12 of the tubular portion 13 is a block 14 provided with a sleeve portion 15 within which is formed a recess 16, a coiled spring 17 bearing against one end of the recess 16 and also against the inner end of the tubular member 13. The normal tendency of the spring 17 is to force the block 14 outwardly along the interior 12 of said tubular portion.

Fixed in the block 14 and held therein by a set screw 18 is a rod 19, one end of this rod 19 engaging with the free end of the plunger 5. The tubular member 13 is provided with an elongated slot 20, through which projects a threaded plug 21, threaded into a correspondingly threaded recess 22 in the block 14. This plug 21 also holds in place a plate 23 which is slidable in tracks 24, a collar 25 bearing against said plate 23, and the outer end of the plug 21 being provided with a threaded recess 26, a trigger 27 being positioned on the end of said plug and held thereon by a screw 28.

A handle or grip 29 is fixed to the standard 1 by screws 30. It will thus be appreciated that when pressure is exerted on the trigger 27, the plug 21 will slide in the slot 20, and will cause a movement of the block 14 toward the inner end of the recess 12, against the tension of the spring 17, forcing the plunger 5 inwardly into the gauge 2. The outer end of the tubular member 13 is split, as illustrated at 31, and is provided with parallel upstanding lugs 32, screws 33 being utilized to draw the lugs 32 together, thus clamping in the open end of the tubular member 13 the head 34 of a stem 35.

Longitudinally slidable through the stem 35 is a rod or shaft 36, a disc 37 being threaded to the inner end of said rod. The head 34 of the stem 35 is provided with a recess 38, within which is positioned a coiled spring 39, said spring bearing against the inner end of the recess 38 and against one face of the disc 37, the normal tendency of the spring 39 being to force the disc 37 away from the head 34. The stem 35, adjacent to its outer end, is provided with a slot 40 therethrough, and in this slot 40 is positioned a U-shaped member 41 composed of spring metal, and having feelers, arms, or fingers 42 formed thereon. The outer end 43 of the rod 36 is threaded into the member 41. It will thus be appreciated that when the spring 39 has forced the disc 37 away from the head 34, the inner end of the member 41 will be in engagement with the shoulders 44 on the stem 35, and the arms or feelers 42 will have converged toward each other so that the sum of their maximum diameter will be no greater than the outer diameter of the stem 35.

Threaded into the extreme outer end of the stem 35 is a plug 45, provided with a conical or tapered tip 46 projecting inwardly toward the stem 35.

It will be instantly apparent and noted, from a glance at the drawing, that the spring 17 is of considerably greater strength than the spring 39, so that under normal conditions the spring 17 will force the block 14 outwardly in the recess 12 to the limit afforded by the sliding of the plug 21 in the slot 20. The rod 19 will engage the inner end of the rod 36, forcing the disc 37 outwardly, or to the left, as illustrated in Fig. 2, contracting the spring 39, and forcing the inner tapered edges 47 over the conical projection 46, and resulting in a spreading of the feeler arms 42, said spreading of the feeler arms being limited, of course, by the internal diameter of the bore or cylinder being measured or gauged.

The operation of my present novel device is simple, and will be readily understood by those skilled in this art, being briefly described as follows:

It being desired to gauge the internal diameters of any desired cylinder, which diameters should conform to a standard, the handle 29 is grasped in one hand and the trigger 27 is retracted toward said handle. The plate 23 will constitute an efficient bearing to take up the strain on the plug 21, during the retraction of the trigger. This will slide the block 14 to the right, permitting the spring 39 to force the disk 37 away from the head 34. This will result in a moving or a sliding of the rod 36 to the right, Fig. 2, and will pull the feeler arms 42 away from the conical projection 46, permitting said arms to return to normal position. When the rear end of the member 41 is in engagement with the shoulders 44, said feeler arms 42 will be either flush with the outer surface of the stem 35, or slightly therebelow. Thereupon the outer end of the stem is inserted into a master bore, until the feeler arms 42 are within the bore, whereupon pressure on the trigger 27 is released. This release of pressure on the trigger 27 will permit the spring 17 to force the block 14 to the left, the rod 19 engaging the inner end of the rod 36 and forcing said rod 36 to the left, whereupon the beveled ends 47 of the arms 42 will ride on the projection 46 and be spread apart. The separation of the arms 42 will be limited by the internal diameter of the master bore being utilized. Thereupon the operator rotates the frame 6 until the zero indication on the dial 3 is directly beneath the hand or pointer 4. The plunger 5 being constantly in engagement with one end of the rod 19, is constantly controlled by the position of said rod 19, any variation in the position of the plunger 5 being instantly transmitted to the hand 4.

Thereupon the trigger 27 is retracted and the device withdrawn from the master cylinder. When gauging the cylinders under test, this operation of retracting the trigger and inserting the outer end of the stem 35 into each cylinder is repeated. If the pointer 4 returns to the zero position on the dial 3, the operator is then certain that the diameter of the cylinder being tested is standard with the master cylinder. If there should be any variation in the diameter of the cylinder from standard, either greater or less, such variation will be instantly indicated on the dial 3, with either a plus or minus reading, as the case may be. The dial 3 may be graduated with any suitable indications, such as ten-thousandths of an inch, so that any variation, however slight, will be instantly apparent to the operator.

My present novel gauge is capable of use for substantially any diameter of cylinders, by interchanging stems 35, and feeler members 41. So long as the size of the head 34 of any stem 35 is maintained, these stems may be readily removed, by loosening the screws 33, withdrawing the stem, and replacing another stem with any desired size of feeler member 41.

I believe that the cylinder gauge illustrated and described in the present application is novel, and I have therefore claimed the same broadly herein.

The simplicity, efficiency, and accuracy of my novel gauge will be instantly apparent to those skilled in this art.

While I have necessarily described my present invention somewhat in detail, it will be appreciated that I may vary the size, shape, and arrangement of parts within reasonably wide limits, without departing from the spirit of the invention.

My invention is further described and defined in the form of claims as follows:

1. In a cylinder gauge of the kind described, as standard, an indicator carried thereby, a plunger adapted to transmit movement to said indicator, a stem carried at one end by said standard and having opposed slots adjacent to its outer end, a substantially U-shaped movable member of spring metal mounted in said stem, the arms of said U-shaped member constituting feelers, means to normally spread said feelers through said slots and beyond the diameter of said stem, means to effect movement of said member toward and from said spreading means, and means to transmit the movement of said member to said plunger.

2. In a cylinder gauge of the kind described, a standard, an indicator carried thereby, a plunger adapted to transmit movement to said indicator, a tubular barrel on said standard, a slidable block located in said barrel, a spring to normally force said block outwardly in said barrel, means to limit the outward movement of said block, a rod carried by said block and maintained in constant engagement with said plunger, a stem projecting from said barrel, a rod slidable in said stem and in normal engagement with said first rod, said stem having a slot therein adjacent to its outer end, a feeler member located in said slot and secured to the outer end of the rod in said stem, resilient feeler arms on said member, said spring normally forcing the rod in said stem outwardly, and means to effect spreading of said arms beyond the diameter of said stem upon outward movement of the rod in the stem.

3. In a cylinder gauge of the kind described, a standard, an indicator carried thereby, a plunger adapted to transmit movement to said indicator, a tubular barrel on said standard, a slidable block located in said barrel, a spring to normally force said block outwardly in said barrel, means to limit the outward movement of said block, a rod carried by said block and maintained in constant engagement with said plunger, a stem projecting from said barrel, a rod slidable in said stem and in normal engagement with said first rod, said stem having a slot therein adjacent to its outer end, a feeler member located in said slot and secured to the outer end of the rod in said stem, resilient feeler arms on said member, said spring normally forcing the rod in said stem outwardly, means to effect spreading of said arms beyond the diameter of said stem upon outward movement of the rod in the stem, means to slide said block inwardly in said barrel against the tension of the spring, and resilient means operative upon the rod in said stem to slide said rod inwardly along said stem when said block is moved inwardly in said barrel, whereby said resilient feeler arms will converge toward each other until the sum of their maximum diameters is not greater than the diameter of said stem.

4. In a cylinder gauge of the kind described, a standard, an indicator carried thereby, a plunger adapted to transmit movement to said indicator, a tubular barrel on said standard, a slidable block located in said barrel, a spring to normally force said block outwardly in said barrel, means to limit the outward movement of said block, a rod carried by said block and maintained in constant engagement with said plunger, a stem projecting from said barrel, a rod slidable in said stem and in normal engagement with said first rod, said stem having a slot therein adjacent to its outer end, a feeler member located in said slot and secured to the outer end of the rod in said stem, resilient feeler arms on said member, said spring normally forcing the rod in said stem outwardly, means to effect spreading of said arms beyond the diameter of said stem upon outward movement of the rod in the stem, means to slide said block inwardly in said barrel against the tension of the spring, and resilient means operative upon the rod in said stem to slide said rod inwardly along said stem when said block is moved inwardly in said barrel, whereby said resilient feeler arms will converge toward each other until the sum of their maximum diameters is not greater than the diameter of said stem, the pressure of the spring in said barrel being greater than the pressure of the resilient means associated with the rod in said stem.

5. In a cylinder gauge of the kind described, a standard, an indicator carried thereby, a plunger adapted to transmit movement to said indicator, a tubular barrel on said standard, a slidable block located in said barrel, a spring to normally force said block outwardly in said barrel, means to limit the outward movement of said block, a rod carried by said block and maintained in constant engagement with said plunger, a stem projecting from said barrel, a rod slidable in said stem and in normal engagement with said first rod, said stem having a slot therein adjacent to its outer end, a feeler member located in said slot and secured to the outer end of the rod in said stem, resilient feeler arms on said member, said spring normally forcing the rod in said stem outwardly, a conical member adjacent to the outer end of said stem and projecting inwardly into said slot, said feeler arms engaging said conical member to effect spreading of said arms beyond the diameter of said stem upon outward movement of the rod in the stem, means to slide said block inwardly in said barrel against the tension of the spring, and resilient means operative upon the rod in said stem to slide said rod inwardly along said stem when said block is moved inwardly in said barrel, whereby said resilient feeler arms will converge toward each other until the sum of their maximum diameters is not greater than the diameter of said stem, the pressure of the spring in said barrel being greater than the pressure of the resilient means associated with the rod in said stem.

In testimony whereof, I have signed my name to this specification.

CAESAR B. LITTERIO.